US 12,093,192 B2

United States Patent
Shamsi et al.

(10) Patent No.: US 12,093,192 B2
(45) Date of Patent: Sep. 17, 2024

(54) DOCKING STATION STATUS NOTIFICATIONS

(71) Applicant: HEWLETT-PACKARD DEVELOPMENT COMPANY, L.P., Spring, TX (US)

(72) Inventors: Osaid Ahmed Shamsi, Spring, TX (US); Charles J. Stancil, Spring, TX (US); Thong Thai, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 139 days.

(21) Appl. No.: 17/718,537

(22) Filed: Apr. 12, 2022

(65) Prior Publication Data

US 2023/0325327 A1     Oct. 12, 2023

(51) Int. Cl.
*G06F 1/16* (2006.01)
*G06F 1/26* (2006.01)
*G06F 13/10* (2006.01)

(52) U.S. Cl.
CPC ............ *G06F 13/102* (2013.01); *G06F 1/266* (2013.01)

(58) Field of Classification Search
CPC .............................. G06F 13/102; G06F 1/266
USPC ........................................................ 710/303
See application file for complete search history.

(56) References Cited

U.S. PATENT DOCUMENTS

| | | | | |
|---|---|---|---|---|
| 2005/0264987 A1* | 12/2005 | Krancher | ............... | G06F 1/1632 361/679.41 |
| 2012/0011287 A1* | 1/2012 | Zeung | .................... | G06F 1/1632 710/16 |
| 2015/0142993 A1* | 5/2015 | Blanc | ................... | G06F 13/4068 710/16 |
| 2017/0168971 A1* | 6/2017 | Glik | ...................... | G06F 13/4068 |
| 2020/0218324 A1* | 7/2020 | Decamp | ................. | G06F 1/1632 |
| 2021/0048850 A1* | 2/2021 | Hsia | ........................... | G06F 8/65 |
| 2022/0391188 A1* | 12/2022 | Sayyed | .................. | H04L 41/082 |
| 2023/0236632 A1* | 7/2023 | Lukanc | ...................... | G06F 8/65 361/679.41 |

* cited by examiner

*Primary Examiner* — Titus Wong
(74) *Attorney, Agent, or Firm* — Quarles & Brady LLP (57) ABSTRACT

In an example in accordance with the present disclosure, a computing device docking station is described. The computing device docking station includes a computing device port to receive a connector of a host computing device and a display device port to receive a connector of a display device. The computing device docking station also includes a dock management controller. The dock management controller is to 1) determine a status of the computing device docking station and 2) generate a notification indicating the status of the computing device docking station. The computing device docking station also includes a display controller to generate an on-screen display (OSD) presentation of the notification on the display device coupled to the display device port.

12 Claims, 5 Drawing Sheets

Your docking station detected a problem with the front USB port. For assistance please use your smart phone to scan the QR code below.

Your docking station suffered from an overcurrent event from the device plugged in USB port #2. Please contact technical support at 1-800-123-HELP for further assistance.

DOCKING STATION STATUS NOTIFICATIONS

BACKGROUND

Computing devices can be connected to any number of peripheral devices to increase their functionality. For example, a monitor or multiple monitors may be coupled to a computing device to provide a visual interface for the user. As another example, an input device such as a mouse, keyboard, touch pad, etc. may be coupled to the computing device. As other examples, the peripheral device may be a storage device, a scanner, a printer, and/or a projector.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations that coincide with the description; however, the description is not limited to the examples and/or implementations provided in the drawings.

DETAILED DESCRIPTION

Peripheral devices connect to a computing device to augment the performance of the computing device. Peripheral devices may be of a variety of types. For example, peripheral devices may be input devices such as microphones, keyboards, a mouse, and others. In some examples, a peripheral device may be an output device such as a monitor, a projector, or a virtual reality headset. In yet another example, the peripheral device may be an external memory device. While specific reference is made to a few example peripheral devices, there are a wide variety of peripheral devices that could be coupled to a computing device and the list of peripheral devices is sure to expand over time.

The present specification describes a computing device docking station that couples a computing device to peripheral resources. The computing device docking station provides a single physical connection between the peripheral devices and the computing device. That is, rather than connecting each peripheral device to the computing device individually, the peripheral devices may be coupled to the docking station and the docking station is coupled to the computing device with a single connection. As such, the docking station facilitates portability of the computing device as a single connector is connected/disconnected from the computing device docking station, rather than a disconnection/connection per peripheral device.

However, like computing devices, docking stations may have status' that should be communicated to a user. For example, hardware components of the computing device docking station such as device ports may be improperly functioning. As another example, the program code instruction set that manages the docking station may be updated. A computing device docking station not having a display screen may attempt to provide status information via single or multi-colored light-emitting diodes (LEDs) that are turned on or sequentially blink to communicate a particular status. However, the LEDs may not effectively communicate or identify the status and may be confusing or disregarded by a user. For example, LED blinks are hard to understand, and may mean different things from product to product.

In some examples a connected host computing device may ascertain some status information from the computing device docking station. However, these systems rely on host computing device involvement in the collection and presentation of docking station status information. Accordingly, when a computing device docking station is not coupled to a host computing device, the computing device docking station status may be unascertainable.

Accordingly, the present specification describes a computing device docking station that can display health and status information about itself to one or more connected display devices without having a host computing device connected to the computing device docking station.

Specifically, a dock management controller of the computing device docking station determines health information about the computing device docking station or an error condition that may have occurred on the computing device docking station. Examples of information collected include an alternating current (AC) adapter connection, dock instruction set version, docking station update status, overcurrent and/or overvoltage events, and active port connections. While particular reference is made to certain collected information, the computing device docking station may collect other information as well.

The dock management controller uses this information to render a self-health dashboard, in some examples in the form of a bitmap image. This bitmap image is sent to a display controller with OSD capability. The display controller, which may be a multi-stream transport (MST) hub, may convert and transmit the bitmap image to connected display devices. The dock management controller may control when the display controller displays this image, for example when there is no connected host computing device and a user has opted in to seeing a health dashboard.

Specifically, the present specification describes a computing device docking station. The computing device docking station includes a computing device port to receive a connector of a host computing device and a display device port to receive a connector of a display device. The computing device docking station also includes a dock management controller to 1) determine a status of the computing device docking station and 2) generate a notification indicating the status of the computing device docking station. The computing device docking station also includes a display controller to generate an OSD presentation of the notification on a display device coupled to the display device port.

The present specification also describes a method. According to the method, hardware controllers of a computing device docking station are surveyed to determine a status of the computing device docking station. A dock management controller of an inactive computing device docking station generates a visual notification indicating the status of the computing device docking station. The display controller displays, on an inactive display device coupled to the computing device docking station, an OSD of the visual notification.

The present specification also describes a non-transitory machine-readable storage medium encoded with instructions executable by a processor. The machine-readable storage medium includes instructions to, when executed by the processor, cause the processor to, at a computing device docking station with an inactive computing device port 1) detect a status of the computing device docking station and 2) generate, at a dock management controller of an inactive computing device docking station, a visual notification indicating the status of the computing device docking station. In this example, the visual notification indicates the status of the computing device docking station. The instructions are also executable by the processor to transmit to a display device coupled to the computing device docking station, an OSD of the visual notification.

In summary, using such a computing device docking station, method, and machine-readable storage medium may, for example, 1) provide for docking station health information, 2) communicate health information in a user-friendly format; 3) provide greater detail regarding computing device docking station status; and 4) provide the status information, even when coupled to an inactive computing device docking station. However, it is contemplated that the devices disclosed herein may address other matters and deficiencies in a number of technical areas, for example.

As used in the present specification and in the appended claims, the term, "controller" includes a processor and memory. The processor includes the circuitry to retrieve executable code from the memory and execute the executable code. As specific examples, the controller as described herein may include machine-readable storage medium, machine-readable storage medium and a processor, an application-specific integrated circuit (ASIC), a semiconductor-based microprocessor, a central processing unit (CPU), and a field-programmable gate array (FPGA), and/or other hardware device.

The memory may include a machine-readable storage medium, which machine-readable storage medium may contain, or store machine-usable program code for use by or in connection with an instruction execution system, apparatus, or device. The memory may take many forms including volatile and non-volatile memory. For example, the memory may include Random-Access Memory (RAM), Read-Only Memory (ROM), optical memory disks, and magnetic disks, among others. The executable code may, when executed by the respective component, cause the component to implement at least the functionality described herein.

As used in the present specification and in the appended claims, the term "active" refers to a computing device docking station or a display device that is in communication with a host computing device that is awake, or active and driving content to the display device and/or computing device docking station. By comparison, an "inactive" docking station or display device is not coupled to a host computing device or is coupled to a host computing device that is in a sleep state (e.g., sleep, hibernation) where the host computing device is not driving content to the display device and/or computing device docking station. For example, even though a computing device docking station may be collecting data regarding hardware component performance/functionality, such a computing device docking station may be "inactive" if not connected to a host computing device or connected to an inactive or sleeping host computing device.

Further, as used in the present specification and in the appended claims, the term "a number of" or similar language is meant to be understood broadly as any positive number including 1 to infinity.

Figure 1:
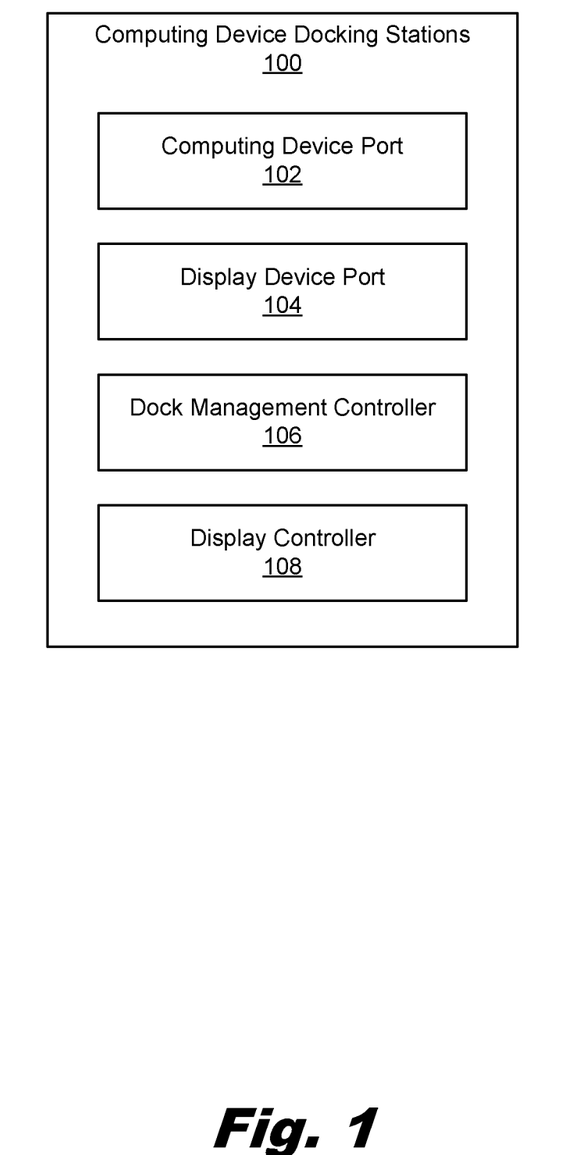
FIG. 1 is a block diagram of a computing device docking station for generating an on-screen display (OSD) indicating a computing device docking station status, according to an example of the principles described herein.

Turning now to the figures, FIG. 1 is a block diagram of a computing device docking station (100) for generating an OSD indicating a computing device docking station status, according to an example of the principles described herein. As described above, the computing device docking station (100) provides the capability of generating and displaying computing device docking station (100) status information, even when inactive, i.e., when a host computing device is not coupled to the computing device docking station (100) or when a host computing device coupled to the computing device docking station (100) is inactive (e.g., sleeping or in hibernation).

The computing device docking station (100) includes a computing device port (102) to receive a connector of a host computing device. That is, as described above, the docking station (100) may facilitate connection of a host computing device to multiple peripheral devices via a single cable connection between the computing device docking station (100) and the host computing device. The computing device port (102) may be of a variety of types. For example, the computing device port (102) may be a universal serial bus (USB) type-C port to receive a USB type-C connector of a host computing device. While particular reference is made to a particular type of computing device port (102), the computing device port (102) may be of a variety of types. Moreover, while specific reference is made to a wired computing device port (102), in some examples the computing device port (102) may be a wireless port to establish a wireless connection with the host computing device.

The computing device docking station (100) also includes a display device port (104) to receive a connector of a display device. That is, one of the peripheral devices that the computing device docking station (100) may couple to the host computing device is a display device for visual presentation of information. As with the computing device port (102), the display device port (104) may be of a variety of types including a high-definition multimedia interface (HDMI) port, a DisplayPort, or a USB type-C port, among others. Again, while particular reference is made to a particular type of display device port (104), the display device port (104) may be of a variety of types. Moreover, while specific reference is made to a wired port, in some examples the display device port (104) may be a wireless port to establish a wireless connection with the display device.

In addition to these ports, the computing device docking station (100) may include additional ports, such as ports to connect the aforementioned peripheral devices, whether these peripheral devices be human interface devices or other input devices, output devices, or any other type of peripheral device.

FIG. 1 also depicts a dock management controller (106) of the computing device docking station (100). In general, the dock management controller (106) determines a status of the computing device docking station (100) and generates a notification indicating the status of the computing device docking station (100).

The dock management controller (106) may collect data indicative of the status of the computing device docking station (100). In general, the status of the computing device docking station (100) refers to the health, configuration, and/or performance of the computing device docking station (100) and/or any of its hardware components. For example, the dock management controller (106) may be coupled to the different peripheral ports which may be on the computing device docking station (100). In this example, the dock management controller (106) collects information regarding a connection state and/or performance of the peripheral ports. That is, the peripheral ports may be coupled to controllers which receive signals when a peripheral device is connected to the peripheral port. The peripheral controllers may also receive signals indicating an interruption of the connection between the peripheral device and the peripheral port, due for example to malfunction of the peripheral port and/or a disconnection of the peripheral device from the peripheral port. In either case, metadata or a control signal received from the peripheral controller may be used to generate a notification to be displayed to the user.

As another example, the dock management controller (106) may be coupled to a docking station power monitor which detects the current and/or voltage passing through the computing device docking station (100). Such a power monitor may indicate threshold voltages and currents that if exceeded may result in damage to the computing device docking station (100) or coupled host computing devices and peripheral devices. The power monitor may therefore detect when the current or voltage is greater than these threshold levels indicating an "overcurrent" or "overvoltage" event. This information may be passed to the dock management controller (106) which generates the notification based on the received overcurrent and/or overvoltage information.

As yet another example, the dock management controller (106) may perform instruction set updates, or be coupled to a processor that performs such updates. That is, a manufacturer of the computing device docking station (100) may push certain program instruction updates which updates may provide the computing device docking station (100) with updated instruction sets to correct defects or bugs in the computing device docking station (100) operation or otherwise enhance the functionality of the computing device docking station (100). Accordingly, this information regarding an update operation may be collected and passed to the dock management controller (106) to generate an associated notification.

As yet another example, the dock management controller (106) may include a sensor, such as a temperature sensor, which may detect the temperature within the computing device docking station (100). As a temperature that is greater than a threshold amount may damage the computing device docking station, the dock management controller (106) may receive an output of the sensor and provide a notification and presentation to notify a user.

While particular reference is made to particular statuses of a computing device docking station (100), the computing device docking station (100) may have a variety of other states, which may be determined by the dock management controller (106).

Based on this collected information, the dock management controller (106) generates a notification indicating the status of the computing device docking station (100). In an example, generating the notification may include selecting a static notification message from a database of notifications. That is, the computing device docking station (100) may include a database of notifications that are indexed via an identifier or code. The computing device docking station (100) may include circuitry to determine a code for a particular notification based on the received information regarding the status. For example, the computing device docking station (100) may receive an indication of a malfunctioning peripheral USB port. The computing device docking station (100) may map the indication to an identifier such that a notification indicating the malfunctioning peripheral USB port may be called from the database and passed to the display controller (108). In other words, the dock management controller (106) may include, or reference, a mapping between information received at the dock management controller (106) relating to computing device docking station status and an associated notification in a database.

In other examples, the dock management controller (106) may generate a dynamic notification. That is, rather than selecting a static notification, the dock management controller (106) may generate a visual notification that is specific to the information collected. For example, a manufacturer may push, or a dock management controller (106) may fetch, an instruction set update, which instruction set is identified via a version number. Accordingly, the dock management controller (106) may generate a user interface element, such as a bitmap image, which 1) identifies the instruction set update is being performed and 2) identifies the version number associated with the instruction set.

As a specific example, the computing device docking station may include a lookup table. Different events may index into that lookup table. For example, a USB port overcurrent event may index to a fixed text string "Your docking station suffered from an overcurrent event from the device plugged into USB port #X" where X is determined by the dock management controller (106) based on the hardware status signal, or metadata as described above. That text string, with the port number inserted, may get appended to a text string stating "Please contact manufacturer tech support for additional information" to form the complete OSD notification.

Accordingly, the dock management controller (106) surveys hardware components and associated controllers, for example via an inter-integrated circuit (I2C) interface, for status information. This information is used to generate a notification, which notification is passed to a display controller (108) to be presented on a display device coupled to the display device port (104).

Accordingly, the display controller (108) generates an OSD of the notification on a display device that is coupled to the display device port (104). That is, the display controller (108) processes data associated with the notification into a format compatible with the display device. In some examples, processing may include converting the notification into a format compatible with the display device. For example, if the data is a bitmap image, the display controller (108) may not need to convert the data into another format and processing the data may include positioning the notification so that it appears at a particular location as defined with the notification data. In the example where the data is not a bitmap image, but has some other format such as American standard code for information interchange (ASCII) characters, the display controller (108) may convert the data into a bitmap image and position the notification as described above. In either case, the data may be stored in working memory and the display controller (108) may scan out the image stored in working memory to the display device.

That is, a display device is a passive component that may rely on the processor of another computing device to determine what is to be presented thereon. In this example, the display controller (108) provides the processing resources to active and instruct the display device regarding the presentation of content thereon.

As such, the present computing device docking station (100) provides the OSD of computing device docking station (100) status information even when a host computing device is not connected. This is due to the dock management controller (106) operation to collect status information for the computing device docking station (100) and the display controller (108) controlling the display device to present the information, regardless of whether a host computing device is coupled to the docking station (100) or not.

Figure 2:
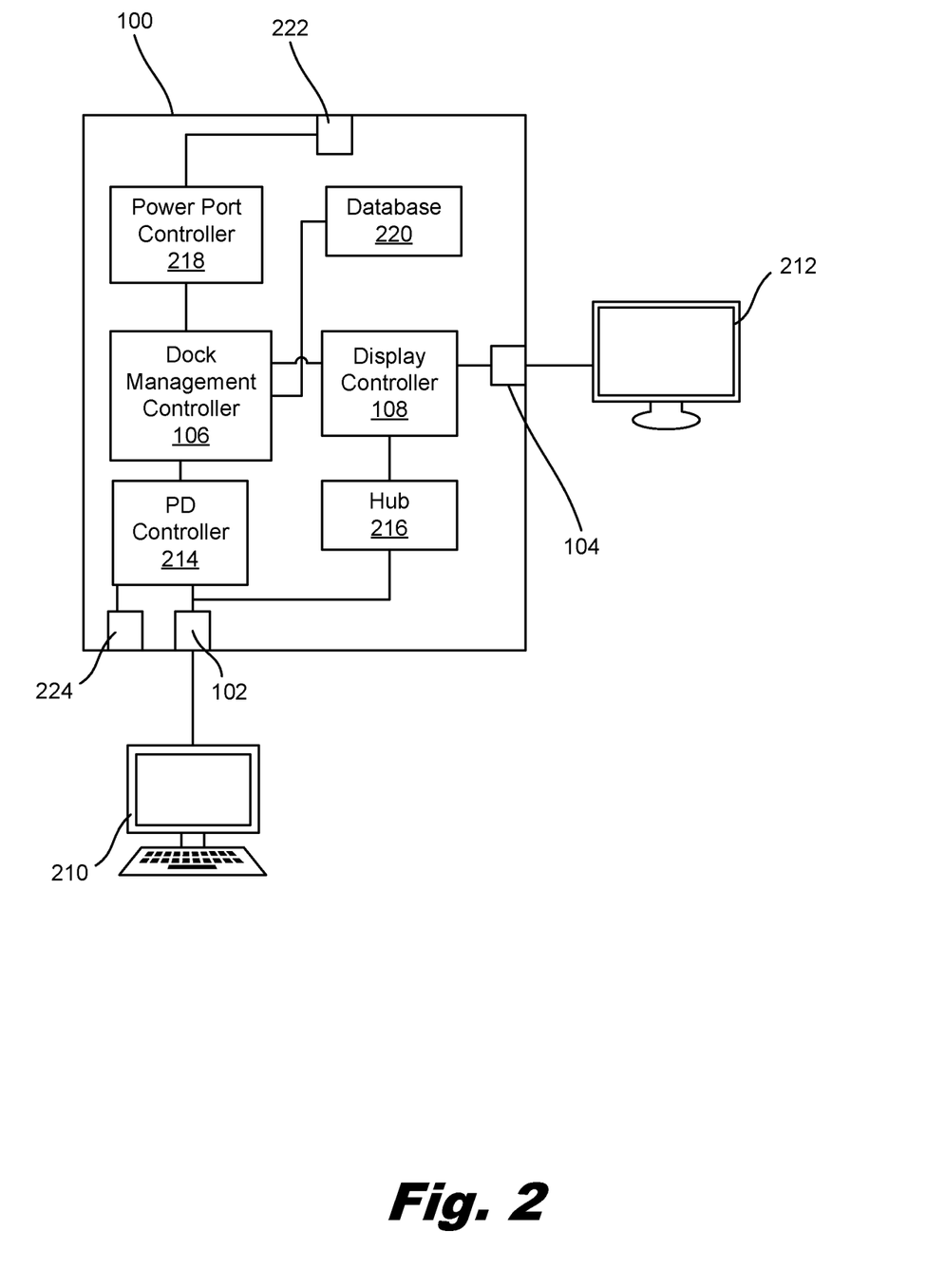
FIG. 2 is a diagram of a computing device docking station for generating an OSD indicating a computing device docking station status, according to an example of the principles described herein.

FIG. 2 is a diagram of a computing device docking station (100) for generating an OSD indicating computing device docking station status, according to an example of the principles described herein. FIG. 2 clearly depicts the computing device docking station (100) with a host computing device (210) coupled to a computing device port (102). FIG. 2 also depicts a display device (212) coupled to a display device port (104) of the computing device docking station (100). FIG. 2 also depicts the dock management controller (106) and display controller (108) described previously.

As described above, the computing device docking station (100) of the present specification allows for the presentation of computing device docking station (100) status information. In some examples, such a presentation may be when the computing device port (102) is active as presented in FIG. 2. That is, a host computing device (210) may be coupled to the computing device docking station (100) via the computing device port (102). In this example, the OSD of the notification may overlay the computing device-controlled window on the display device (212). That is, the host computing device (210) may be executing any number of applications that generate visual information on the display device (212). Examples of applications include web browsers, video streaming applications, word processing applications, video and photo editing applications and any number of other applications. In this example, the OSD of the notification may overlay, that is display on top of, whatever window is being presented on the display device (212) under the management/control of the host computing device (210). Put another way, the data to be presented on the display device (212) from the host computing device (210) may pass from the computing device port (102), to a hub (216) and the display controller (108) to ultimately be transferred to the display device (212). In this context the hub (216) may separate signals coming through the computing device port (102) and break the signals into display and data signals Data describing the OSD is also passed to the display controller (108) for presentation on the display device (212). As a specific example of an overlaid status notification, responsive to a detected overcurrent and/or overvoltage event which may damage components of the host computing device (210), display device (212), and/or computing device docking station (100), a warning notification may be displayed over the host computing device-controlled windows on the display device (212).

In another example, the computing device port (102) is inactive, meaning that there is no host computing device (210) coupled to the computing device port (102). As described above, in this example, the dock management controller (106) and the display controller (108) are still able to generate the OSD of the notification, even though there is no host computing device (210) coupled to the docking station (100). That is, when a host computing device (210) is coupled to the computing device docking station (100), the host computing device (210) generates the control signals to generate a display. However, when the host computing device (210) is not coupled to the computing device docking station (100), the dock management controller (106) and the display controller (108) generate the control signals to generate the presentation of the OSD notification.

As a specific example, a computing device docking station (100) may be subject to an instruction set update. When the computing device port (102) is inactive, a user may not be aware of such an update and disconnect the docking station (100) from a power supply, thus interrupting the update. However, implementing the computing device docking station (100) of the present specification, the OSD notification may be presented notwithstanding an inactive computing device port (102), as the dock management controller (106) and display controller (108) generate the notification independent of any host computing device (210). Doing so may prevent a user from inadvertently interrupting a computing device docking station (100) update procedure.

FIG. 2 also depicts additional components that may be found on the computing device docking station (100). For example, the computing device docking station (100) may include a power delivery (PD) controller (214) to detect the connector of the host computing device (210). That is, the PD controller (214) is electrically connected to the computing device port (102) and the dock management controller (106), for example via an 120 or USB connection. In this example, the PD controller (214) may generate connection status information for the computing device port (102). That is, the status of the computing device docking station (100) that is presented in the OSD display is a connection status of the computing device port (102).

In an example, the computing device docking station (100) includes a power port (222) to receive a connector of a power supply. In this example, the power port controller (218) may determine the status/presence of a connected power supply. In this example, the status of the computing device docking station (100) that is presented in the OSD display is a connection status of the power port (222) and/or connection information of the power port connection.

FIG. 2 also depicts a database (220) that may include a repository of static notifications. That is, in some examples the dock management controller (106) may generate a graphical image that is based on and unique to the collected data. In another example, the dock management controller (106) generates the notification by selecting a static notification from the database (220) based on a determined status of the computing device docking station (100). That is, the dock management controller (106) may receive information regarding the status of the computing device docking station (100) from hardware controllers, processors, and other sources. The dock management controller (106) may then rely on this status information to select a static notification from the database (220) that corresponds to this status.

As another example, rather than selecting a static notification, the dock management controller (106) may generate a graphical notification based on textual data/metadata collected from components within the computing device docking station (100).

FIG. 2 also depicts a peripheral device port (224) to which peripheral devices such as input devices, output devices, etc.

may be coupled to provide additional functionality to the host computing device (210). In this example, the PD controller (214) may collect information such as a connection status, operation status, etc. from the peripheral device port (224). This status information may be used to generate a notification presented on the display device (212), in some cases independent of the host computing device (210).

Figure 3:
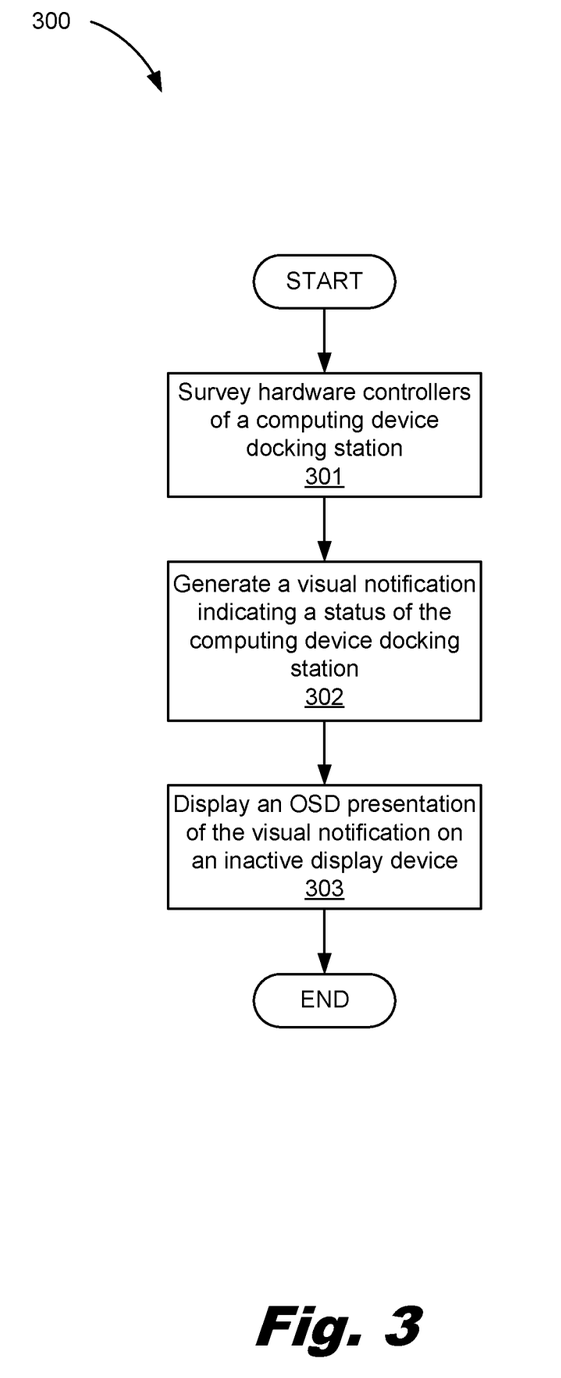
FIG. 3 is a flowchart of a method for generating an OSD indicating a computing device docking station status, according to an example of the principles described herein.

FIG. 3 is a flowchart of a method (300) for generating an OSD indicating computing device docking station status, according to an example of the principles described herein. According to the method (300), a dock management controller (106) of a computing device docking station (100) surveys (block 301) hardware controllers of a computing device docking station (100) to determine a status of the computing device docking station (100). That is, the computing device docking station (100) is made up of a variety of hardware components including input ports, power supplies, processors, memory devices, and other integrated circuits. Each of these hardware components is monitored by a controller. The various hardware controllers track information regarding the status of the various hardware components. The dock management controller (106) may query, or otherwise receive data/metadata indicating the status and activity of each of each of these hardware components. This status information may be presented on an OSD as the status of the computing device docking station (100). The present specification describes various status notifications that may be presented including the presence/connection of a host computing device (210), presence/connection of a power supply, presence/connection of a peripheral device, program set version, an in-progress program set update operation, events which may be impact performance and operability of the computing device docking station (100) and/or coupled devices.

The dock management controller (106) may generate (block 302) a visual notification indicating the status of the computing device docking station (100). As described above, such generation (block 302) may be at an inactive computing device docking station (100). That is, the visual notification may be generated (block 302), notwithstanding no host computing device (210) is coupled to the computing device port (102). That is, rather than relying on the host computing device (210) to generate any notification regarding a computing device docking station (100) status, the computing device docking station (100) itself generates the notification. As such, the status of the computing device docking station (100) may be determined, even when there is no host computing device (210) coupled to the computing device docking station (100).

As described above, generation (block 302) of the visual notification may include selecting a static notification from the database (220) or may include creating the visual notification based on information collected form the hardware controllers of the computing device docking station (100).

Following generation of the notification, the computing device docking station (100) may cause the OSD of the visual notification to be displayed (block 303) on an inactive display device (212) coupled to the computing device docking station (100). That is, the display controller (108) may receive a data packet that includes the visual notification and may convert the visual notification to a format readable by the display device (212). That is, the display controller (108) may control the display device (212) and generate control data to facilitate the generation of the notification on the display device (212).

Figure 4A:
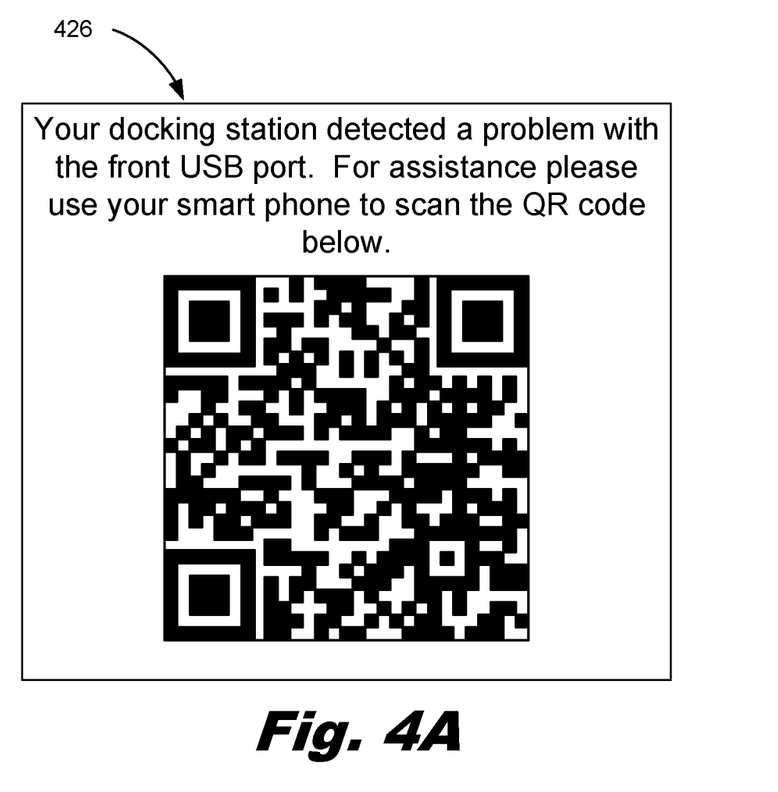
FIGS. 4A and 4B depict example OSDs presented on a display device coupled to the computing device docking station, according to an example of the principles described herein.
Figure 4B:
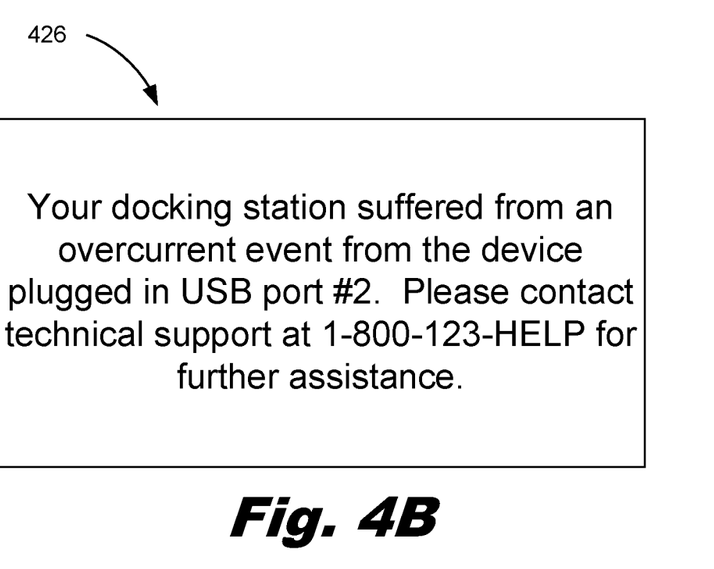

FIGS. 4A and 4B depict example OSDs (426) presented on a display device (212) coupled to the computing device docking station (100), according to an example of the principles described herein. The notification may be of a variety of types. For example, as depicted in FIG. 4A, the OSD (426) may include a quick response (QR) code, or other machine-readable code such as a barcode that, when captured, provides supplemental information related to the detected status. For example, upon scanning of the QR code OSD (426) depicted in FIG. 4A, the user may be directed to a website which includes an update to correct an issue indicated in the OSD (426). In another example as depicted in FIG. 4B, the OSD (426) may provide additional information, such as a component subjected to a malfunctioning event and may recommend a remedial action, such as contacting a support helpline to address the issue. The format of the OSD (426) may be of a variety of types as well. In one example, the visual notification is a bitmap image. However, other formats for the OSD (426) may be implemented in accordance with the principles described herein.

While particular reference is made to particular OSDs (426) that present particular notifications, a variety of notifications may be presented. For example, the visual notification may indicate active connection(s) to the computing device docking station (100), either through the computing device port (102), the display device port (104), or any one of the peripheral device ports (224). In another example, the notification may be of a recommended remedial action. For example, the OSD (426) may instruct a user to install an instruction set update, or reboot the computing device docking station (100) to remedy an issue. In another example, the notification may indicate an instruction set version of the computing device docking station (100).

As yet another example, the notification may indicate an update status of the computing device docking station (100). For example, the instruction set may be updated to a newer version. If the computing device docking station (100) is disconnected from a power supply, the update of the instruction set may be interrupted which may temporarily or permanently alter the performance of the computing device docking station (100). Accordingly, by presenting an OSD (426) notification of an update operation in progress, a user is notified so that disconnection during the update may be prevented. As yet another example, the notification may indicate when an event, such as an overcurrent or overvoltage event, has occurred. Such events may damage the computing device docking station (100) and or certain devices coupled to the computing device docking station (100). Accordingly, by notifying of such events, a user may be alerted to such a condition and may take remedial action. Accordingly, the OSD (426) may present a health status of the computing device docking station (100), such that the user may be notified and/or take remedial action as dictated by the presented information.

In some examples, the presentation of the OSD (426) may be triggered by some event. The event which triggers the presentation of the OSD (426) may take a variety of forms. For example, the OSD (426) may be presented when a host computing device (210) is disconnected from the computing device docking station (100). Other examples of events that may trigger the presentation of the OSD (426) include an overcurrent event, an overvoltage event, a detected malfunction, a detected connection at a port, and a determination that an upgrade is available or being performed among others. While particular reference is made to particular events, a variety of other events may trigger presentation of an associated OSD (426).

Figure 5:
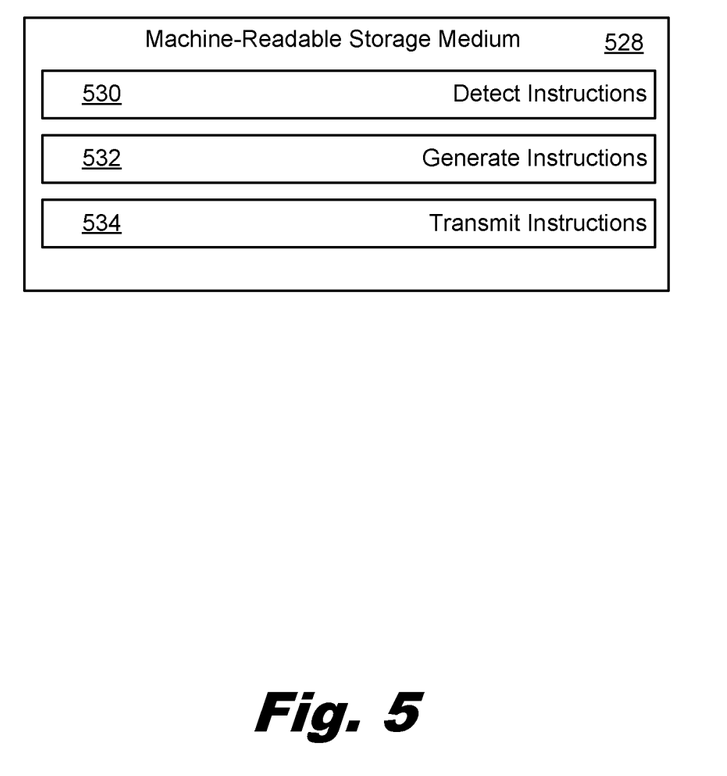
FIG. 5 depicts a non-transitory machine-readable storage medium for generating an OSD indicating a computing device docking station status, according to an example of the principles described herein.

FIG. 5 depicts a non-transitory machine-readable storage medium (528) for generating on-screen display (OSD) presentation of docking station status, according to an example of the principles described herein. To achieve its desired functionality, a computing device docking station (100) includes various hardware components. Specifically, a computing device docking station (100) includes a processor and a machine-readable storage medium (528). The machine-readable storage medium (528) is communicatively coupled to the processor. The machine-readable storage medium (528) includes a number of instructions (530, 532, 534) for performing a designated function. In some examples, the instructions may be machine code and/or script code.

The machine-readable storage medium (528) causes the processor to execute the designated function of the instructions (530, 532, 534). The machine-readable storage medium (528) can store data, programs, instructions, or any other machine-readable data that can be utilized to operate the computing device docking station (100). Machine-readable storage medium (528) can store machine readable instructions that the processor of the computing device docking station (100) can process, or execute. The machine-readable storage medium (528) can be an electronic, magnetic, optical, or other physical storage device that contains or stores executable instructions. Machine-readable storage medium (528) may be, for example, Random-Access Memory (RAM), an Electrically Erasable Programmable Read-Only Memory (EEPROM), a storage device, an optical disc, etc. The machine-readable storage medium (528) may be a non-transitory machine-readable storage medium (528).

Referring to FIG. 5, detect instructions (530), when executed by the processor, cause the processor to, detect a status of the computing device docking station (100). Generate instructions (532), when executed by the processor, cause the processor to, generate a dock management controller (106) of an inactive computing device docking station (100), a visual notification indicating the status of the computing device docking station (100). Transmit instructions (533), when executed by the processor, cause the processor to, transmit to a display device (212) coupled to the computing device docking station (100), an OSD presentation of the visual notification.

In summary, using such a computing device docking station, method, and machine-readable storage medium may, for example, 1) provide for docking station health information, 2) communicate health information in a user-friendly format; 3) provide greater detail regarding computing device docking station status; and 4) provide the status information, even when coupled to an inactive computing device docking station. However, it is contemplated that the devices disclosed herein may address other matters and deficiencies in a number of technical areas, for example.

What is claimed is:

1. A computing device docking station, comprising:
  a computing device port to receive a connector of a host computing device;
  a display device port to receive a connector of a display device;
  a dock management controller to:
    determine a status of the computing device docking station based on health, configuration, or performance parameters of the computing device docking station;
    generate a notification indicating the status of the computing device docking station; and
    transmit the notification to a display controller, the display controller to generate an on-screen display (OSD) presentation of the notification on the display device coupled to the display device port;
  wherein, when the computing device port is inactive, the display controller of the computing device docking station controls the display device to generate the OSD presentation of the notification on the display device; and
  wherein, when the computing device port is active, the host computing device controls the display device to generate a host computing device-controlled window on the display device, and the display controller of the computing device docking station controls the display device to generate the OSD presentation of the notification on the display device to overlay the host computing device-controlled window on the display device.

2. The computing device docking station of claim 1, further comprising a power delivery (PD) controller to detect the connector of the host computing device, wherein:
  the PD controller is electrically connected to the computing device port and the dock management controller; and
  the status of the computing device docking station is a connection status of the computing device port.

3. The computing device docking station of claim 1, further comprising a power port to receive a connector of a power supply, wherein the status of the computing device docking station is a connection status of the power port.

4. The computing device docking station of claim 1, further comprising a database of static notifications, wherein the dock management controller is to generate the notification by selecting a static notification from the database based on a determined status of the computing device docking station.

5. A method, comprising:
  surveying hardware controllers of a computing device docking station to determine a status of the computing device docking station based on health, configuration, or performance parameters of the computing device docking station;
  generating, via a dock management controller of the computing device docking station, a visual notification to indicate the status of the computing device docking station;
  transmitting, via an electronic control signal generated by the dock management controller, the notification to a display controller;
  when a host computing device is disconnected from a computing device port of the docking station, controlling a display device, via the display controller of the computing device docking station, to display an on-screen display (OSD) presentation of the notification;
  when the host computing device is connected to the computing device port of the docking station, controlling the display device, via the host computing device, to generate a host computing device-controlled window on the display device; and
  when the host computing device is connected to the computing device port of the docking station, controlling the display device, via the display controller of the computing device docking station, to overlay the host computing device-controlled window with the OSD presentation of the notification.

6. The method of claim 5, wherein the visual notification comprises a recommended remedial action.

7. The method of claim 5, wherein the status indicates an instruction set version of the computing device docking station.

8. The method of claim 5, wherein the status indicates an update status of the computing device docking station.

9. The method of claim 5, wherein the status indicates an overcurrent or overvoltage event at the computing device docking station.

10. The method of claim 5, wherein generating the visual notification comprises creating the visual notification based on information collected from the hardware controllers of the computing device docking station.

11. A non-transitory machine-readable storage medium encoded with instructions executable by a processor, the machine-readable storage medium comprising instructions to, when executed by the processor, cause the processor to, at a computing device docking station with a computing device port:
   determine a status of the computing device docking station based on health, configuration, or performance parameters of the computing device docking station;
   generate a notification indicating the status of the computing device docking station; and
   transmit the notification to a display controller, the display controller to generate an on-screen display (OSD) presentation of the notification on a display device coupled to a display device port;
   wherein, when the computing device port is inactive, the display controller of the computing device docking station controls the display device to generate the OSD presentation of the notification on the display device; and
   wherein, when the computing device port is active, a host computing device controls the display device to generate a host computing device-controlled window on the display device, and the display controller of the computing device docking station controls the display device to generate the OSD presentation of the notification on the display device to overlay the host computing device-controlled window on the display device.

12. The non-transitory machine-readable storage medium of claim 11, wherein the notification is a bitmap image indicating the status of the computing device docking station.

* * * * *

UNITED STATES PATENT AND TRADEMARK OFFICE
CERTIFICATE OF CORRECTION

| | | |
|---|---|---|
| PATENT NO. | : 12,093,192 B2 | |
| APPLICATION NO. | : 17/718537 | |
| DATED | : September 17, 2024 | |
| INVENTOR(S) | : Osaid Ahmed Shamsi et al. | |

It is certified that error appears in the above-identified patent and that said Letters Patent is hereby corrected as shown below:

In the Specification

Column 8, Line 33, "an 120 or" should be --an I2C or--.

Signed and Sealed this
Nineteenth Day of November, 2024

Katherine Kelly Vidal
*Director of the United States Patent and Trademark Office*